United States Patent [19]

Brandstetter et al.

[11] 4,409,363

[45] Oct. 11, 1983

[54] PROCESS FOR THE MANUFACTURE OF A MIXTURE OF POLYCARBONATES AND STYRENE-CONTAINING POLYMERS, USE OF THE MIXTURE AND MOLDED PARTS THEREOF

[75] Inventors: Franz Brandstetter, Neustadt; Franz Haaf, Bad Durkheim, both of Fed. Rep. of Germany

[73] Assignee: BASF Aktiengesellschaft, Ludwigshafen, Fed. Rep. of Germany

[21] Appl. No.: 349,762

[22] Filed: Feb. 18, 1982

[30] Foreign Application Priority Data

Feb. 24, 1981 [DE] Fed. Rep. of Germany ....... 3106758

[51] Int. Cl.³ .................................................. C08L 69/00
[52] U.S. Cl. ....................................... 525/67; 525/146; 525/148
[58] Field of Search ........................ 525/67, 146, 148; 528/198

[56] References Cited

U.S. PATENT DOCUMENTS 3,988,390 10/1976 Prinz et al. ............................ 525/67
4,239,861 12/1980 Braese et al. ....................... 525/146

FOREIGN PATENT DOCUMENTS 854475 11/1960 United Kingdom .

*Primary Examiner*—Wilbert J. Briggs, Sr.
*Attorney, Agent, or Firm*—Norbert M. Lisicki

[57] ABSTRACT

The invention relates to a process for the manufacture of a mixture of a polycarbonate and a styrene-containing polymer whereby the polycarbonate present in solution is initially brought into contact with a precipitating agent. The solvent and the precipitating agent are subsequently separated from the precipitated solid material to prepare a polycarbonate having residual moisture of more than 1 and less than 50 percent by weight relative to the polycarbonate, and where the resultant product with a residual moisture is mixed with the styrene-containing polymer at temperatures above the softening range of the components removing volatile components. The claimed mixtures are suitable for the manufacture of molded parts for cars, bottles and appliances.

6 Claims, No Drawings

PROCESS FOR THE MANUFACTURE OF A MIXTURE OF POLYCARBONATES AND STYRENE-CONTAINING POLYMERS, USE OF THE MIXTURE AND MOLDED PARTS THEREOF

BACKGROUND OF THE INVENTION

1. Field of the Invention

The invention relates to a process for the manufacture of mixtures of styrene-containing polymers and polycarbonates, wherein the polycarbonate is initially brought in contact with a precipitating agent. A solvent and a precipitating agent are subsequently removed from the precipitated solid material to prepare a polycarbonate having a residual moisture. The resultant product is mixed with styrene-containing polymers at temperatures above the softening range of the components to be mixed.

2. Description of the Prior Art

The current state of the art is described in the following: (1) German Patent No. 1,170,141, (2) German Published Application No. 2,329,548, (3) U.S. Pat. No. 2,999,835 (4) Japanese Patent No. 46/37424 and (5) German Application No. 2,427,960.

Mixtures of styrene-containing polymers with polycarbonate are described in (1) and (2). The process of precipitating polycarbonates from the reaction solution after the manufacture using a medium which does not dissolve polycarbonates is described in reference (3). Reference (4) relates to spraying the reaction solution into a large volume of hot water which is also a suitable process by which the water soluble impurities are simultaneously removed.

After separating the polycarbonate polymer, a costly drying process must then be used to isolate the polycarbonate before the desired mixtures can be produced by melting the polymer containing the dried polycarbonate and the styrene. Thus a purpose of this invention was to determine a technically simple process for working polycarbonate into styrene-containing polymers wherein the expensive drying step for the polycarbonate can be avoided.

SUMMARY OF THE INVENTION

This requirement is met by a process for the manufacture of a mixture of a polycarbonate and a styrene-containing polymer comprising (a) contacting a dissolved polycarbonate with a precipitating agent and subsequently removing the solvent and the precipitating agent from the precipitated solid material to prepare a polycarbonate having a residual moisture, and (b) mixing the polycarbonate having the residual moisture and styrene-containing polymer at a temperature above the softening range of the polycarbonate and styrene-containing polymer wherein the polycarbonate having the residual moisture contains more than 1 and less than 50 percent by weight residual moisture, relative to the weight of polycarbonate, and wherein the mixing of the polycarbonate having the residual moisture and the styrene-containing polymer is accomplished while removing volatile ingredients.

The process of this invention is used in the manufacture of mixtures based on styrene-containing polymers and polycarbonates eliminating the polycarbonate drying step.

DESCRIPTION OF THE PREFERRED EMBODIMENTS

The styrene-containing polymers or copolymers useful as the styrene-containing polymer of the mixture made by the process of this invention, are polymers of styrene and/or α-methylstyrene and their copolymers containing acrylonitrile, maleic anhydride or esters of methacrylic acid. The content of comonomers such as acrylonitrile, maleic anhydride and esters of methacrylic acid amount to from 5 to 50 percent by weight, preferably 10 to 35 percent by weight, relative to the styrene and/or the α-methylstyrene-containing copolymer.

The styrene-containing polymer is made by known methods. Thus the polymerization of styrene and/or α-methylstyrene or their copolymerization with the above-mentioned comonomers can take place in bulk, solution or aqueous emulsion.

Also useful as the styrene-containing polymer are polymers which are modified to be impact resistant, such as polystyrene, ABS, acrylonitrile-butadiene-styrene polymers; AES, acrylonitrile-ethylene-styrene polymers; MBS, modified butadiene styrene; ASA, acrylic ester-modified styrene-acrylonitrile terpolymer which are modified to be impact resistant; HIPS, high impact polystyrene; and styrene maleic acid copolymers which are modified to be impact resistant. The rubbers used for the manufacture of these materials which are modified to be impact resistant must have elastomeric properties so that they can cause an improvement of the impact resistance of the thermoplastic. Rubbers therefore are understood to be high molecular weight compounds which have a glass temperature below 0° C., preferably below −30° C., as mentioned in K. H. Illers, *Kolloid Journal,* No. 176, page 110, 1961. The following materials are useful: natural rubber, synthetic rubbers such as polybutadiene, polyisoprenes, and copolymers of butadiene with styrene or acrylonitrile, elastomers based on alkyl esters of acrylic acid with the alkyl radical having 1 to 8 carbon atoms, copolymers of alkyl esters of acrylic acid with butadiene, styrene, acrylonitrile and vinyl ethers as well as copolymers of ethylene-propylene and a non-conjugated diene (and EPDM rubbers).

So-called graft copolymers are preferably used for modifying the impact resistance of the styrene-containing polymer. This constitutes an attempt to render the rubber compatible with the rigid component. The styrene-containing polymers which are modified to be impact resistant can be produced in accordance with familiar processes in emulsion, bulk, solution and/or suspension, or in accordance with combined processes such as bulk-suspension processes. Such processes are described in German Application Nos. 1,238,207; 1,260,135; 1,911,882; 2,427,960 and in U.S. Pat. Nos. 2,694,692; 2,862,904 and 3,903,199.

Polycarbonates which are useful as the polycarbonate of the mixture made by the process of this invention are aromatic polycarbonates based on homopolycarbonates and copolycarbonates. Examples of bisphenol, useful for the manufacture of the aromatic polycarbonates, include: dihydroxydiphenyls, bis-(hydroxyphenyl) alkanes and bis-(hydroxyphenyl) ether. All other bisphenols which are suitable for the manufacture of polycarbonates may also be used. These are described among others in the monograph by H. Schnell, Chemistry and Physics of Polycarbonates, Interscience Publishers, New York, 1964, in U.S. Pat. No. 2,999,835 and in German Published Application No. 2,248,817. Particularly preferred are polycarbonates based on 2,2-bis(4-hydroxyphenyl) propane for the incorporation in predominately styrene-containing copolymers. Particularly well suited for the mixtures using pure styrene polymer, which may also be modified to be impact resistant, is a polycarbonate based on 2,2-bis(4-hydroxy-3,5-dimethylphenyl) propane. The synthesis of the polycarbonates is described for instance in U.S. Pat. No. 2,999,835, British Patent No. 772,627 and Angewandte Makromolekulare (Applied Makromoleklare Chemistry) 55, (1976) pages 175–189.

The polycarbonates are obtained from the reaction solution by precipitating the polymer with a medium, such as methanol and isopropanol, which does not dissolve polycarbonate. In order to remove the water soluble by-products produced during their reaction, however, it is recommended to wash the precipitated product well with water. Another method of obtaining the polycarbonate from the reaction solution consists of spraying the reaction solution directly into hot water. This causes a large part of the organic solvent to evaporate and at the same time water soluble impurities are removed from the polycarbonate. Part of the water and the remainder of the organic solvent and/or precipitating agent, generally 10 to 90 percent by weight, preferably 30 to 70 percent by weight, relative to the amount of liquid phase in the precipitated or sprayed product is now separated mechanically. This separation may be carried out for instance by filtering, pressing or centrifuging. After this treatment the remaining polycarbonate contains more than 1 and up to a maximum of 50 percent by weight, preferably 15 to 40 percent by weight, of residual moisture relative to the solid product.

Solvents in the sense of this invention are organic solvents which are used during the manufacture of the polycarbonates or of the styrene-containing polymer. Precipitation agents in the sense of this invention are organic solvents, for instance alcohols, such as methanol and isopropanol, and water which do not dissolve polycarbonates. The residual moisture is some of the content of solvents and/or precipitating agents relative to the solids. The polycarbonate having a residual moisture and the styrene-containing polymer are mixed by commonly used mixing equipment. Advantageously, extruders or kneaders are used for the mixing process. The styrene-containing polymer is generally introduced into the mixing equipment as a melt.

If an extruder is used as mixing equipment the polycarbonate with a residual moisture content is metered into the extruder first, without heating, by using pressure and, upon completion of the metering, the styrene-containing polymer is added to the extruder in the form of a melt. After combining the polycarbonate and the styrene-containing polymer, the two components are mixed homogeneously by mixing aggregates, for instance by intensively mixing kneader elements in the extruder. During this step the temperature must be above the softening point of the styrene-containing polymer as well as that of the polycarbonate. The mixing temperature is between 180° C. and 320° C., preferably between 200° C. and 280° C.

Commonly used additives such as pigments, dyestuffs, fillers, lubricants, antistatic agents, antioxidants, flame retardants etc. can be admixed either in dry form or can advantageously be added in a moist form together with the polycarbonate having a residual moisture. Care must be taken however that the overall residual moisture from the polycarbonate and the additive does not exceed the upper limit value of 50 percent by weight.

The liquid components present in the polycarbonate, and in the styrene-containing polymer, which are primarily the components representing the residual moisture, specific solvents of the manufacture of the styrene polymer, and volatile or liquid by-products, must be removed from the resultant melt either during or after the mixing process. This is advantageously done by evaporating liquid components.

Degassing devices installed on the extruder in the direction of transport following the mixing zone are used for this purpose. Care must be taken that no solid material is carried through these openings together with steam. This may happen as a result of installing gas vents in the extruder openings whereby solids which are carried along with the steam will be transported back to the main extruder. The degassing can take place either with counter-pressure, without pressure or under vacuum. It is advantageous to plan several degassing stages in sequence with the counter-pressure decreasing in stages in the direction of transport through the main extruder. Together with the water those components which are volatile in steam are also removed. This facilitates additional removal of contaminants from the polycarbonate and the styrene-containing polymers which include residual monomers, oligomers, residual solvent and emulsifiers. As a result of the high heat evaporation the evaporation process of the water removes energy from the melt. For this reason, an optimum temperature profile may be established for the mixing of the starting materials over the entire length of the mixing device by varying the polycarbonate: the more water the moist components of the mixture contain, the more energy must be expended for the evaporation, the more heat is removed from the melt and the lower is the temperature of the melt. It is not necessary to heat the mixing device since sufficient energy can be introduced into the mixed goods to keep them at the desired temperature level by way of the shearing effect of the mixing elements. Without being limited by theory, apparently the viscosity of the mixed components is reduced by the presence of water to such an extent that the mixing process requires significantly less mechanical energy than would be required for processing without water. The relatively low temperature level on the one hand and the low shear forces on the other hand impart much less of a thermal and mechanical stress on the styrene-containing polymers and the polycarbonate than would be the case in traditional mixing processes of the dry thermoplastics. In addition to this the temperature regulation is much simpler for the process of this invention.

The process of this invention thus provides a technically simple mixing of moist polycarbonate with styrene-containing polymers. This process imparts relatively low thermal and mechanical stresses upon the substances to be mixed which is expressed by improved toughness of the styrene-containing polymerizates which are modified to be impact resistant. In spite of this a homogeneous distribution of components A and B is achieved. Furthermore interfering low molecular weight components are removed from the mixture as a result of the mixing process. The process of this invention offers the advantage that no additional melting process is required for the manufacture of mixtures of polycarbonates and styrene-containing polymerizates.

The invention is explained below by way of examples and comparison tests. All parts and percentages listed in the examples and comparison tests refer to weight unless otherwise noted.

The following materials were used for carrying out the process of this invention and the comparison tests.

The following polymers, which were produced in accordance with the data in reference (5) above, were used as styrene-containing polymers.

ABS (I): Acrylonitrile-butadiene-styrene copolymers having a polybutadiene content of 25 percent by weight and a rigid component of 55 percent by weight having a ratio of styrene/acrylonitrile of 5/65 and a viscosity number of 55 milliliters/gram. The average particle size $d_{50}$ value of the flexible component was approximately 0.35 microns.

ABS (II): Acrylonitrile-butadiene-styrene copolymers having a polybutadiene content of 25 percent by weight and a rigid component of 55 percent by weight wherein the rigid component consists of a mixture of about 50 percent by weight of a copolymer of α-methylstyrene/acrylonitrile having an acrylonitrile content of 30 percent by weight relative to the copolymer, having a viscosity number of 50 milliliters/gram and about 50 percent by weight of a copolymer of styrene/acrylonitrile having an acrylonitrile content of 35 percent by weight relative to the copolymer and a viscosity number of 67 milliliters/gram. The average particle size $d_{50}$ of the flexible component was approximately 0.35 microns.

ASA: Acrylic ester-modified styrene-acrylonitrile terpolymer with a rubber content of 25 percent by weight with the rubber having been produced by emulsion polymerization of butylacrylate in the presence of 2 percent by weight of the acrylate of tricyclodecenyl alcohol with a rigid component of 50 percent by weight, with a rigid component representing a copolymer, which contains 35 percent by weight of acrylonitrile and has a viscosity number of 70. The component was produced in accordance with German Patent No. 1,260,135.

HIPS: A polystyrene having an average particle size of the flexible component of 2 to 3 microns and produced in solution.

The polycarbonate Type (I) based on 2,2-bis-(4-hydroxyphenyl) propane was produced in accordance with Example 2 of U.S. Pat. No. 2,999,835, and the polycarbonate Type (II) based on 2,2-bis-(4-hydroxy-3,5-dimethyl-phenyl) propane was produced in accordance with the data contained in Angewandte Makromolekulare (Applied Makromolekulare Chemistry 55, (1976), pages 175-189.

The parameters described in the examples and comparative tests were determined as follows: the softening point according to Vicat was determined in accordance with DIN 53 460/B. In order to determine the notch impact strength according to DIN 53 and 453 and the breaking energy according to DIN 53.453, page 1, the appropriate test samples were produced on an injection molding machine at 250° C. The test was carried out at 23° C. The average particle size, weight average, of the disperse flexible component phase was determined by counting and averaging the particles of the same size class, of constant interval width, in a thin layer electronn microscope. The curve of the distribution totals is determined with the volume mean of the particles (third power of the apparent diameter) within the intervals. With a 50 percent ordinate value the equivalent diameter can then be read from the abszisse. The listed average diameters represent an average value of at least 5000 particles. The relative viscosity, which was measured at 25° C. using 0.5 grams polycarbonate in 100 milliliters methylene chloride solution, was 1.3 for the two polycarbonates used. The viscosity number of the rigid component of a ABS (I) and (II) and of ASA was determined in accordance with DIN 53 726 dissolving 0.5 grams of material in 100 milliliters of dimethylformamide.

EXAMPLES 1-10

The polymers listed in Table I were used in the indicated quantities. After precipitation and intensive washing with distilled water after extensive removal of the precipitating agent and/or solvent, the polycarbonate was further processed by moisture removal to a residual moisture content of 35 percent using a double screw extruder as described in German Application No. 2,037,784.

The moist polycarbonate was uniformly added through an opening at the beginning of the extruder at room temperature. A corresponding quantity of the melt of the styrene-containing polymer was metered in through an adjacent opening so that the compositions were obtained which are listed in the table. Located behind this opening in the extruder is the homogenization area in the form of intensively mixing, kneading elements. The mass temperature was in the range of 230° C. to 280° C. The liquid components were removed by three degassing devices which follow the homogenization area.

Comparison Tests A-J

The parts by weight listed in Table II of styrene-containing polymer and of polycarbonate which had been dried in a vacuum of 1 Torr at 60° C. for a period of 24 hours after processing from solution by precipitating, washing and filtering (residual moisture 500 ppm) were melted, homogenized, mixed and granulated in a double screw extruder at 280° C.

As shown by a comparison of the measured values listed in the table, the mixtures produced in accordance with the process of this invention show a higher softening point as well as better toughness, as represented by Notch Impact Resistance and Breaking Energy values than mixtures produced in accordance with the state of the art.

TABLE I

| Examples of the invention | Styrene-Containing Polymer | | Bisphenol Type Polycarbonate | | Softening Point °C. | Notch Impact Resistance at 23° C. (KJ/sq. meter) | Breaking Energy at 23° C. (Nm) |
|---|---|---|---|---|---|---|---|
| | Type | Parts by Wt. | Type | Parts by Wt. | | | |
| 1 | ABS (I) | 90 | I | 10 | 100 | 6.1 | 12.0 |
| 2 | ABS (I) | 70 | I | 30 | 107 | 6.6 | 22.5 |
| 3 | ABS (I) | 50 | I | 50 | 118 | 24.8 | 36.6 |
| 4 | ABS (I) | 30 | I | 70 | 132 | 31.1 | 48.5 |

TABLE I-continued

| Examples of the invention | Styrene-Containing Polymer Type | Parts by Wt. | Bisphenol Type Polycarbonate Type | Parts by Wt. | Softening Point °C. | Notch Impact Resistance at 23° C. (KJ/sq. meter) | Breaking Energy at 23° C. (Nm) |
|---|---|---|---|---|---|---|---|
| 5 | ABS (I) | 10 | I | 90 | 142 | 49.7 | 68.0 |
| 6 | ABS (II) | 80 | I | 20 | 118 | 4.2 | 13.2 |
| 7 | HIPS | 10 | II | 90 | 194 | 6.0 | 11.6 |
| 8 | HIPS | 25 | II | 75 | 192 | 10.0 | 13.1 |
| 9 | ASA | 70 | I | 30 | 106 | 5.3 | 20.1 |
| 10 | ASA | 30 | I | 70 | 133 | 23.2 | 43.7 |

TABLE II

| Comparison Tests Not of the the invention | Styrene-Containing Polymerizate Type | Parts by Wt. | Bisphenol Type Polycarbonate Type | Parts by Wt. | Softening Point °C. | Notch Impact Resistance at 23° C. (KJ/sq. meter) | Breaking Energy at 23° C. (Nm) |
|---|---|---|---|---|---|---|---|
| A | ABS (I) | 90 | I | 10 | 99 | 5.8 | 8.9 |
| B | ABS (I) | 70 | I | 30 | 105 | 6.0 | 16.2 |
| C | ABS (I) | 50 | I | 50 | 112 | 22.7 | 34.0 |
| D | ABS (I) | 30 | I | 70 | 130 | 30.0 | 40.5 |
| E | ABS (I) | 10 | I | 90 | 142 | 39.0 | 58.5 |
| F | ABS (II) | 80 | I | 20 | 115 | 1.3 | 6.2 |
| G | ASA | 70 | I | 30 | 104 | 3.6 | 15.2 |
| H | ASA | 30 | I | 70 | 129 | 16.8 | 36.0 |
| I | HIPS | 10 | II | 90 | 190 | 4.2 | 7.2 |
| J | HIPS | 25 | II | 75 | 188 | 7.0 | 9.6 |

The embodiments of the invention in which an exclusive property or privilege is claimed are defined as follows:

1. A process for the manufacture of a mixture of a polycarbonate and a styrene containing polymer comprises
(a) contacting a dissolved polycarbonate with a precipitating agent and subsequently removing the solvent and the precipitating agent from the precipitated solid material to prepare a polycarbonate having a residual moisture, and
(b) mixing the polycarbonate having the residual moisture and styrene-containing polymer melt at a temperature above the softening range of the polycarbonate and styrene-containing polymer
wherein the polycarbonate having the residual moisture contains more than 1 and less than 50 percent by weight residual moisture, relative to the weight of polycarbonate, and wherein the mixing of the polycarbonate having the residual moisture and the styrene-containing polymer is accomplished while removing volatile ingredients.

2. The process of claim 1 wherein the residual moisture of the polycarbonate is between 15 percent by weight and 40 percent by weight, relative to the weight of the polycarbonate.

3. The process of claim 1 wherein the styrene-containing polymer is an acrylonitrile-butadiene-styrene copolymer having a polybutadiene content of 25 percent by weight and a rigid component of 55 percent by weight having a ratio of styrene/acrylonitrile of 5/65 and a viscosity number of 55 milliliters/gram, having an average particle size $d_{50}$ value of the flexible component of approximately 0.35 microns.

4. The process of claim 1 wherein the styrene-containing polymer is an acrylonitrile-butadiene-styrene copolymer having a polybutadiene content of 25 percent by weight and a rigid component of 55 percent by weight wherein the rigid commponent consists of a mixture of about 50 percent by weight of a copolymer of α-methylstyrene/acrylonitrile having an acrylonitrile content of 30 percent by weight relative to the copolymer, having a viscosity number of 50 milliliters/gram and about 50 percent by weight of a copolymer of styrene/acrylonitrile having an acrylonitrile content of 35 percent by weight relative to the copolymer and a viscosity number of 67 milliliters/gram, having an average particle size $d_{50}$ of the flexible component of approximately 0.35 microns.

5. The process of claim 1 wherein the styrene-containing polymer is an acrylic ester-modified styrene-acrylonitrile terpolymer with a rubber content of 25 percent by weight with the rubber having been produced by emulsion polymerization of butylacrylate in the presence of 2 percent by weight of the acrylate of tricyclodecenyl alcohol with a rigid component of 50 percent by weight, with a rigid component representing a copolymer, which contains 35 percent by weight of acrylonitrile and has a viscosity number of 70.

6. The process of claim 1 wherein the styrene-containing polymer is a polystyrene having an average particle size of the flexible component of 2 to 3 microns and produced in solution.

* * * * *